July 17, 1928.  
R. REINBOLD  
1,677,248  
SOLDERING DEVICE  
Filed Sept. 16, 1927
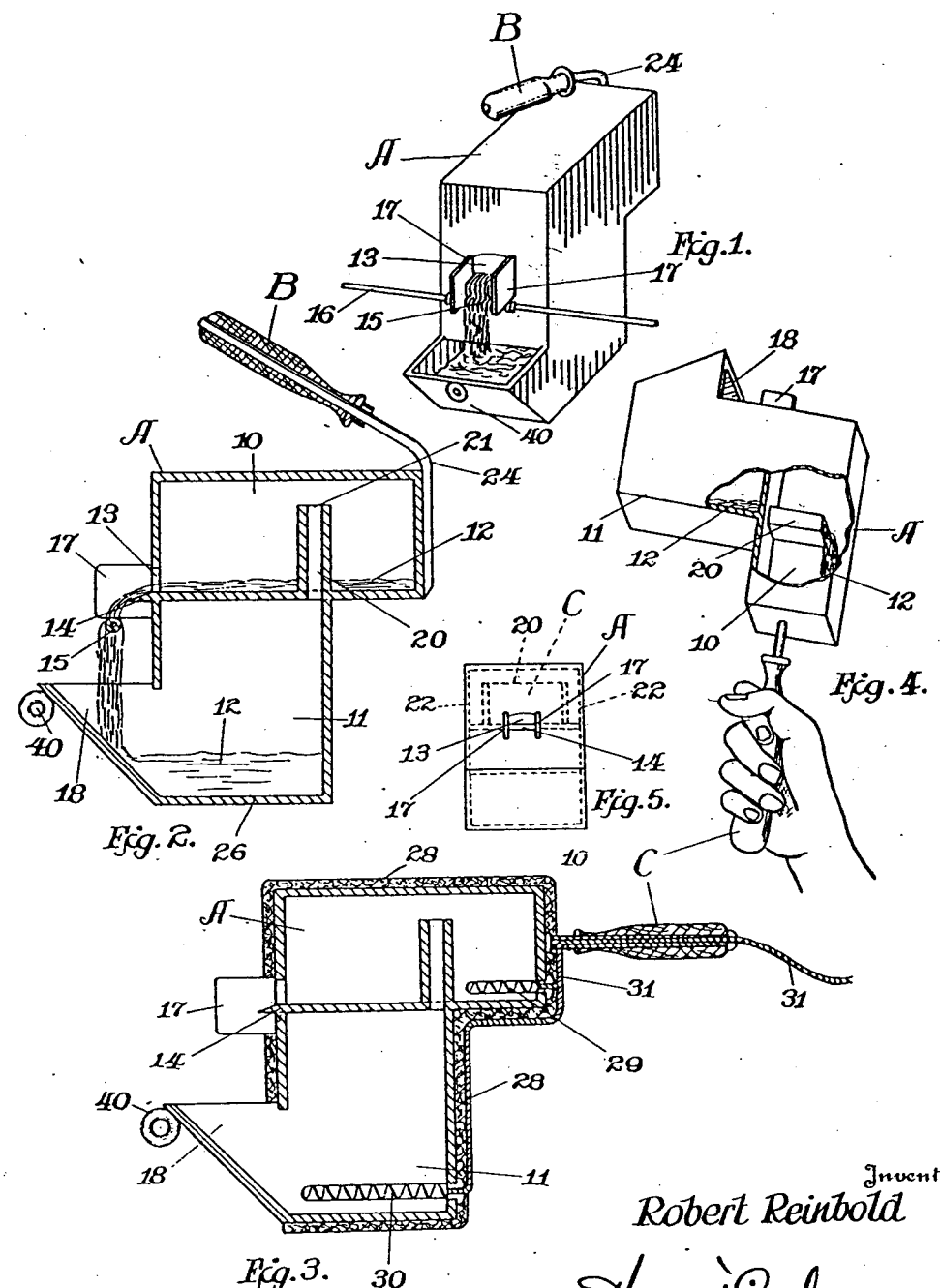
Robert Reinbold, Inventor Patented July 17, 1928.

1,677,248

UNITED STATES PATENT OFFICE.

ROBERT REINBOLD, OF ST. PAUL, MINNESOTA.

SOLDERING DEVICE.

Application filed September 16, 1927. Serial No. 219,894.

My invention relates to improvements in soldering devices the primary object of which is to provide a safe, easily operated, and more rapid means of soldering a joint than has been accomplished heretofore for use in attaching the ends or splices in cables where it is desirable that the same be soldered.

It is a feature of my invention to provide a soldering means which may do better work more rapidly and without spilling the solder so that my soldering means is more economical and being safer in not spilling the hot solder on men below the operator soldering a joint out on a line. By this means I use less solder, have practically no waste in the loss of solder and the operator can accomplish the work in less time in a much more practical way for soldering joints as will be hereinafter described.

It is a feature of my invention to provide a soldering device wherein the same can be used where solder pot and ladle cannot be used. It is also a feature of my invention to provide a soldering device which can be used with one hand and having no working parts to get out of order, of a compact nature which may contain its own heating elements so that electrical or other suitable heating elements may be employed to keep the solder hot and the same may be insulated so that the compartments of the soldering device keep the solder in liquid form at all times in its use.

It is also an object of my soldering device to provide a means of permitting the solder to be poured from one compartment to another and in providing means for resting the soldering device on the wire while it is being soldered, the solder from one compartment running from a pouring lip over the article being soldered and the surplus solder running off into the lower compartment, after which the solder from the lower compartment may be readily transferred to the upper compartment by tilting the soldering device upward. I also provide a means of holding my soldering device by a handle member which holds the same in a safe position so that no solder will run out while it is being held by the handle of a particular nature.

These features and objects will be magnified and more clearly set forth, together with other details and more important features of the invention brought out so as to fully describe my device.

In the drawings forming part of my specification:

Figure 1 is a perspective view illustrating my soldering device.

Figure 2 is a side sectional view of the same showing the relation of the compartments.

Figure 3 illustrates a sectional view of a different form of my soldering device.

Figure 4 shows the soldering device tilted up so that the solder can run from the lower to the upper compartment.

Figure 5 is a front view of the soldering device illustrated in Figures 3 and 4.

My soldering device A is designed of a compact nature and having a peculiar construction to provide an upper compartment 10 and a lower compartment 11. The upper compartment is adapted to contain the melted solder 12, and the lower compartment is adapted to receive the solder as it runs from the upper compartment.

The soldering device A is provided with the opening 13 from which projects the pouring lip 14 so that the solder 12 may run from the compartment 10 through the opening 13 and onto the wire joint 15 of the wire 16, as illustrated in Figure 1.

I provide my soldering device with supporting and splash plates 17 which extend upright on either side of the opening 13. The supporting plates 17 permit the soldering device A to be rested and pivoted with the major portion of its weight on the wire 16 in soldering a joint 15 as illustrated, and these plates also prevent the solder from splashing to the side but cause it to be confined to the approximate width of the pouring lip 14 and thus permit a point in the wire to be very readily and quickly soldered in a much more desirable manner than pouring from a ladle as has been done heretofore. In this manner my soldering device A provides a means of soldering a wire joint by virtually pouring the solder in a thin stream over the joint confined between two directing plates and these plates provide a pivotal support so that the soldering device can be tipped to the proper position to pour the solder onto the joint. The supports 17 also steady the operation so that the workmen may readily pour the solder to the joint to be fused together in a very desirable manner.

As the solder 12 runs over the joint 15, the surplus solder is adapted to run into the lower compartment 11 through the scoop opening 18. Thus virtually no solder is wasted in the operation of my soldering device and the solder may be freely poured over the wire in a manner such as would be hard to accomplish by the old methods. I thus provide a new and more desirable method and means of soldering wire joints. My soldering device is adapted for use where the ordinary soldering pot and ladle cannot be used.

The compartment 11 is connected to the compartment 10 by means of the elongated tubular portion 20 which projects up into the compartment 10 with the upper open end 21 of the same adjacent the top of the compartment 10. This tubular passageway 20 permits the solder 12 in the compartment 11 to be poured back into the compartment 10 by tilting the soldering device A in a backward direction as illustrated in Figure 4. In this figure a portion of the soldering device A is broken away to illustrate the solder running from the compartment 11 through the tubular portion 20 and back into the compartment 10. The tubular portion 20 extends across the compartment 10 as illustrated in dotted outline in Figure 5, leaving only small openings 22 on either side of the same for the solder to run from the back of the compartment 10 toward the front of the same to the pouring lip 14, the solder being of a rather thick nature is inclined to be held back by the obstruction formed by the tubular portion 20 and thus the forward flow of the solder is retarded just sufficiently to prevent an overcrowding of the flow of solder from the opening 13, even though the soldering device A is tipped forward into soldering position in operation.

I provide my soldering device A with a handle B of a peculiar nature which is connected by the shank 24 extending from the handle B down along the back of the upper compartment 10. The handle B extends forward being positioned angularly in relation to the compartment 10 and virtually centrally over the top and extending toward the front of the same. This provides a handle member which is adapted to permit the operator to carry the soldering device by the handle in such a position as to cause it to recline backward so that the solder 12 is held in the backward portion of the upper compartment 10. The positioning of the handle B in this manner provides a very practical means of supporting my soldering device A either in lifting the same from the ground up to the linemen on the pole, or in handling the same in use.

The body portion of my soldering device A forming the compartments 10 and 11 is made of heavy sheet steel or other suitable metal which has a tendency to hold the heat after the solder has been heated and melted within the same to a considerable extent. The bottom 26 of the compartment 11 forms a base portion which can be set upon the melting stove and the solder can be readily melted in the compartment 11 and then by tilting the soldering device A in the position illustrated in Figure 4, the solder will run into the compartment 10 ready for use.

My soldering device A may be provided with a straight handle C illustrated in Figures 3 and 4 and also in Figure 5, which extends straight out from the back of the compartment 10 so that the device A may be carried and operated by the same.

In Figure 3 I have illustrated my soldering device A with an insulating outer portion 28 extending over virtually the whole outer surface of the same so as to cause the compartments 10 and 11 to retain the heat longer and to protect the sides of the device A from the outer atmosphere to a very large extent. With this insulating means which may be of any suitable nature the solder can be kept melted within the compartments for a very long time. However, I have illustrated in Figure 3 electrical heating elements 29 and 30, the element 29 being positioned in the compartment 10 and the element 30 in the compartment 11. These heating elements are connected by the electrical cord 31 so that if it is desired the soldering device A may be provided with these heating elements to keep the solder melted at all times in the use of the soldering device A.

I provide a ring 40 which permits the lifting or carrying of my soldering device A so that it can be lifted by a rope or other suitable means up to the lineman on the pole. This permits the soldering device A to be lifted by the ring with the device A held in a position so that the solder runs to the back of the same and will not spill out of the device A.

The simplicity of my soldering device is of primary importance in my invention and the peculiar construction together with the arrangement of the compartments permit me to provide a soldering device adapted to function in a manner as has been long desired heretofore, particularly for soldering wire joints by linemen out on the poles, either repairing or putting up wires, nevertheless, my soldering device is equally adapted for other uses and in any place where a wire joint is adapted to be soldered together by means of pouring the solder over the joint to unite the connecting parts. This soldering device gives a safe, easily operated, more rapid, and virtually a non-spillable soldering device of a very compact nature. I have found that my soldering device prevents the spilling of the solder, overcomes waste and requires little heat to melt and keep the solder melted in operation. The simplicity is apparent, there being no working parts to get out of order and it is a very material advantage to have a soldering means which is adapted to permit the solder to run from one compartment to the other, catching the surplus as it runs over the joint and permitting the solder to be elevated back to the upper compartment ready for use in making another joint.

In accordance with the patent statutes I have described the principles of operation of my soldering device and while I have illustrated a particular form and construction and peculiar arrangement of the parts. I desire to have it understood that these illustrations are only suggestive of a means of carrying out my invention and that other adaptations of my invention and forms may be applied in carrying out the spirit of my invention within the scope of the following claims without departing from the essence of my invention.

I claim:

1. A soldering device comprising means for holding melted solder, means for permitting the solder to be pourned over an object to be soldered, and means for collecting the sulplus solder not used up in soldering the object.

2. A soldering device including, an upper and lower compartment adapted to hold melted solder therein, a pouring lip extending from the upper compartment over an opening in the lower compartment whereby when solder is poured from the upper compartment onto an object to be soldered, the unused solder is caught up through the opening in the lower compartment.

3. A soldering device including, two compartments adapted to hold melted solder, a communicating passage to said compartments to permit solder to be poured from one compartment to the other internally thereof, and communicating outer passages adapted to permit the solder to be poured from one compartment to the other.

4. A soldering device including, superimposed compartments, a receiving opening formed in the lower compartment, a pouring lip positioned above said receiving opening, a tubular passageway projecting up into said superimposed compartment adapted to direct melted solder from said lower compartment to the upper compartment when said soldering device is tilted in a backward direction.

5. A soldering device for soldering wire joints including, means for holding melted solder, means for resting said device on the wire to be soldered, a pouring lip adapted to direct the melted solder to the wire, a receiving compartment for receiving the surplus melted solder, a tubular means for directing solder from the receiving compartment back to the first compartment, and a handle supporting member extending above said compartment in a manner to permit the supporting of said device so that the same may be tilted forward or backward in the operation of the same.

6. In a device of the class described including, means for holding melted solder within an insulated compartment, a pouring lip extended from said compartment, and a compartment for receiving the surplus solder poured from said first compartment.

7. A soldering device including, compartments positioned adjacent each other, insulation extending over said compartments, pouring means extending from one of said compartments to permit the melted solder to be poured therefrom, an opening for receiving the surplus solder poured from said lip, and a tubular passageway within said first compartment adapted to permit the melted solder to be poured from the receiving compartment back to the first compartment, said tubular passageway forming a retarding means within said first compartment to hold back the melted solder within the same in operation.

8. A soldering device including, means for holding melted solder, means for receiving the surplus melted solder poured from said first holding means, means permitting the solder to be directed to said first holding means, and heating means within said holding means adapted to keep the solder melted within the same.

9. A soldering device including, compartments for holding melted solder, and electrical heating means positioned within said compartments to keep the solder at a melted temperature.

10. A soldering device comprising, compartments positioned adjacent each other, means for insulating said compartments, outer communicating passageways formed in said compartments, and an inner communicating passageway.

11. A soldering device comprising, superimposed compartments, electrical heating means within said compartments, insulating means about said compartments, and inner and outer communicating passageways connecting said compartments.

12. A soldering device comprising, superimposed solder compartments, a handle for carrying said soldering device, and a loop oppositely disposed to the handle in a manner to lift the solder device to a lineman on the pole with the same tipped backward to prevent spilling of the melted solder therewithin.

ROBERT REINBOLD.